United States Patent
Ovcharik et al.

(10) Patent No.: US 11,089,006 B2
(45) Date of Patent: Aug. 10, 2021

(54) SYSTEM AND METHOD OF BLOCKING NETWORK CONNECTIONS

(71) Applicant: AO Kaspersky Lab, Moscow (RU)

(72) Inventors: Vladislav I. Ovcharik, Moscow (RU); Oleg G. Bykov, Moscow (RU); Natalya S. Sidorova, Moscow (RU)

(73) Assignee: AO Kaspersky Lab, Moscow (RU)

(*) Notice: Subject to any disclaimer, the term of this patent is extended or adjusted under 35 U.S.C. 154(b) by 310 days.

(21) Appl. No.: 16/359,417

(22) Filed: Mar. 20, 2019

(65) Prior Publication Data
US 2020/0007533 A1    Jan. 2, 2020

(30) Foreign Application Priority Data
Jun. 29, 2018 (RU) .................... 2018123699

(51) Int. Cl.
*H04L 29/06* (2006.01)
*G06F 16/906* (2019.01)

(52) U.S. Cl.
CPC ........ *H04L 63/0823* (2013.01); *G06F 16/906* (2019.01); *H04L 63/0263* (2013.01); *H04L 63/0435* (2013.01)

(58) Field of Classification Search
CPC ............ H04L 63/0823; H04L 63/0263; H04L 63/0435; H04L 63/168; H04L 63/101; H04L 63/0227; H04L 63/0428; H04L 63/20; H04L 29/06775; H04L 63/1408; G06F 16/906; G06F 21/577
See application file for complete search history.

(56) References Cited

U.S. PATENT DOCUMENTS

| | | | |
|---|---|---|---|
| 6,990,238 B1* | 1/2006 | Saffer | G06F 16/34 382/224 |
| 8,744,840 B1* | 6/2014 | Morrison | G06F 40/45 704/10 |
| 9,178,902 B1* | 11/2015 | Zagorsky | H04L 63/1433 |
| 9,300,674 B2* | 3/2016 | Borovikov | H04L 63/10 |
| 9,386,024 B1* | 7/2016 | Zaitsev | G06F 21/85 |
| 2004/0177075 A1* | 9/2004 | Rangadass | G06F 16/178 |
| 2008/0016037 A1* | 1/2008 | Enomoto | G01C 21/26 |

(Continued)

FOREIGN PATENT DOCUMENTS

EP     3306511 A1    4/2018
WO    2017/101541 A1    6/2017

*Primary Examiner* — Sher A Khan
(74) *Attorney, Agent, or Firm* — Arent Fox LLP; Michael Fainberg

(57) ABSTRACT

Disclosed herein are systems and methods for blocking network connections. In one aspect, an exemplary method comprises, intercepting a certificate from the server when establishing a protected connection between a server and a client, determining whether the intercepted certificate is similar to one or more forbidden certificates, the determination of whether the intercepted certificate is similar to one or more forbidden certificates comprising transforming the intercepted certificate in accordance with a method of determining similarities between certificates and a method of saving forbidden certificates in a database of forbidden certificates, and blocking the connection when the intercepted certificate is similar to the one or more forbidden certificates.

11 Claims, 7 Drawing Sheets

(56) References Cited

U.S. PATENT DOCUMENTS

| | | | |
|---|---|---|---|
| 2008/0030497 A1* | 2/2008 | Hu | G06T 7/162 |
| | | | 345/419 |
| 2009/0077383 A1* | 3/2009 | de Monseignat | H04L 63/0823 |
| | | | 713/175 |
| 2009/0196186 A1* | 8/2009 | Lidstrom | H04L 41/0631 |
| | | | 370/241 |
| 2012/0076417 A1* | 3/2012 | Yoshii | G06K 9/6292 |
| | | | 382/190 |
| 2014/0188768 A1* | 7/2014 | Bonissone | G06N 20/20 |
| | | | 706/12 |
| 2017/0093886 A1* | 3/2017 | Ovcharik | H04L 9/002 |
| 2017/0116552 A1* | 4/2017 | Deodhar | G06Q 10/06316 |
| 2017/0374057 A1* | 12/2017 | Petrovichev | H04L 63/101 |
| 2018/0069934 A1* | 3/2018 | Jurgenson | H04W 4/029 |
| 2018/0097803 A1* | 4/2018 | Iwanir | H04L 63/0815 |
| 2018/0300319 A1* | 10/2018 | Burriesci | G06F 16/285 |
| 2019/0005113 A1* | 1/2019 | Kenedy | G06F 16/2237 |
| 2019/0058714 A1 | 2/2019 | Joshi et al. | |

* cited by examiner

SYSTEM AND METHOD OF BLOCKING NETWORK CONNECTIONS

CROSS REFERENCE TO RELATED APPLICATIONS

The present application claims priority to Russian Patent Application No. 2018123699, filed on Jun. 29, 2018, the entire content of which is incorporated herein by reference.

FIELD OF TECHNOLOGY

The present disclosure relates to the field of monitoring and filtering network traffic in accordance with specific rules; more specifically, to systems and methods of blocking network connections.

BACKGROUND

At present, there is a growing need for providing data security. When establishing network connections for data to be transmitted to a third party, the use of cryptography protocols makes prevention of disclosure of the data possible. But like any technology, the technologies used in realizing mechanisms of a secure exchange have shortcomings. Furthermore, depending on the method of use, they may be vulnerabilities of a technical or organizational nature. For example, when using SSL and HTTP protocols together, hackers may carry out a man-in-the-middle attack by using a weakness of the technology; the HTTP operation for redirecting to HTTPS via the response code HTTP 302 may allow hackers to carry out the man-in-the-middle or similar attacks. Special tools have been created by hackers to carry out an attack at the point of transfer from a unprotected to a protected communications channel, such as the program for extracting credentials using HTTPs stripping (i.e., SSLStrip). When hackers use these types of tools, the process of the attack looks like the following.

- traffic between the client and the web server is intercepted;
- the HTTPS URL address is detected and replaced with the address HTTP URL;
- certificates are provided to the web server under the guise of the client;
- the traffic from the web server is received on the protected channel and redirected to the client thereof.

When the client is sending data to the web server and when the web server is transmitting to the client, as a result of the attack, the hacker gains access to the data.

One approach to mitigate man-in-the-middle and similar attacks is to utilize time delay verifications, analyze network traffic, and analyze certificates. Another approach is to employ a policy of trusted certificates, allowing a connection only to resources which are present on white lists and only with the use of trusted certificates. However, the use of a policy of trusted certificates renders a protection system inflexible: first, the certificate from the same issuer might be altered, and the connection will fail (since the comparing is done by a fingerprint, and each certificate is unique); second, the permission policy significantly restricts the availability of network resources, confining the resources only for use by the group of the trusted. A potentially trusted certificate also might not be known at a given time to the protection mechanism because the database of trusted certificates was not updated in good time.

Moreover, the use of protected connections may also be employed for unlawful purposes, to conceal transmitted information containing information of unlawful nature. To counter such activity, the unique network address of the resource is blocked in the computer network that is the middle man in the transmittal of such information or the source thereof. Yet, as shown in practice, this is not an effective method because the addresses where resources are residing may change.

Therefore, there is a need for addressing the shortcomings described above and improve data security.

SUMMARY

Aspects of the disclosure relate to the field of computer security, more specifically to systems and methods of blocking network connections—thereby filtering network traffic.

In one exemplary aspect, a method for blocking network connections is implemented in a computer comprising a hardware processor, the method comprising: intercepting a certificate from the server when establishing a protected connection between a server and a client, determining whether the intercepted certificate is similar to one or more forbidden certificates, the determination of whether the intercepted certificate is similar to one or more forbidden certificates comprising transforming the intercepted certificate in accordance with a method of determining similarities between certificates and a method of saving forbidden certificates in a database of forbidden certificates, and blocking the connection when the intercepted certificate is similar to the one or more forbidden certificates.

According to one aspect of the disclosure, a system is provided for blocking network connections, the system comprising a hardware processor configured to: intercept a certificate from the server when establishing a protected connection between a server and a client, determine whether the intercepted certificate is similar to one or more forbidden certificates, the determination of whether the intercepted certificate is similar to one or more forbidden certificates comprising transforming the intercepted certificate in accordance with a method of determining similarities between certificates and a method of saving forbidden certificates in a database of forbidden certificates, and block the connection when the intercepted certificate is similar to the one or more forbidden certificates.

In one exemplary aspect, a non-transitory computer-readable medium is provided storing a set of instructions thereon for blocking network connections, wherein the set of instructions comprises instructions for: intercepting a certificate from the server when establishing a protected connection between a server and a client, determining whether the intercepted certificate is similar to one or more forbidden certificates, the determination of whether the intercepted certificate is similar to one or more forbidden certificates comprising transforming the intercepted certificate in accordance with a method of determining similarities between certificates and a method of saving forbidden certificates in a database of forbidden certificates, and blocking the connection when the intercepted certificate is similar to the one or more forbidden certificates.

In one aspect, the method of determining similarities between certificates comprises: obtaining attributes from the intercepted certificate, expressing a rule in a form of a regular expression, wherein the rule is formed from common attributes of the one or more forbidden certificates that are produced as a result of clustering of a set of the one or more forbidden certificates, and applying the rule to strings of the intercepted certificate, wherein the rule is satisfied when a similarity is found.

In one aspect, the method of determining similarities between certificates comprises: obtaining attributes from the intercepted certificate, constructing an N-dimensional vector based on the obtained attributes, and comparing the constructed N-dimensional vector to clusters in the database of forbidden certificates.

In one aspect, the intercepted certificate is found to be similar to a forbidden certificate of the one or more forbidden certificates when: a distance between the constructed N-dimensional vector of the certificate and a center of at least one cluster in the database is less than a radius of the at least one cluster, or a measure of proximity between the constructed N-dimensional vector and the center of the at least one cluster is less than a threshold value.

In one aspect, when constructing the N-dimensional vector based on the obtained attributes, different weights are used for each attribute to calculate coordinates of respective attributes.

In one aspect, the coordinates of a given attribute are based on frequencies of occurrences of the given attribute.

In one aspect, the attributes of a given certificate comprise one or more of: a date and a time of a start and an end of validity of the given certificate, an owner of the given certificate of a signature key, a public key, a name and details of a certification center, a designation of a cryptographic algorithm, information on a restricted use of a signature, an indication of a country issuing the given certificate, frequency characteristics of symbols of the given certificate, and line offsets in the given certificate and their respective lengths.

The blocking of the network connections in accordance with the teachings of the present disclosure improves computer security by enabling monitoring and filtering of network traffic. The improvement is achieved by: intercepting a certificate from the server when establishing a protected connection between a server and a client, determining whether the intercepted certificate is similar to one or more forbidden certificates, the determination of whether the intercepted certificate is similar to one or more forbidden certificates comprising transforming the intercepted certificate in accordance with a method of determining similarities between certificates and a method of saving forbidden certificates in a database of forbidden certificates, and when the intercepted certificate is similar to the one or more forbidden certificates, blocking the connection.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for blocking network connections to improve data security. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
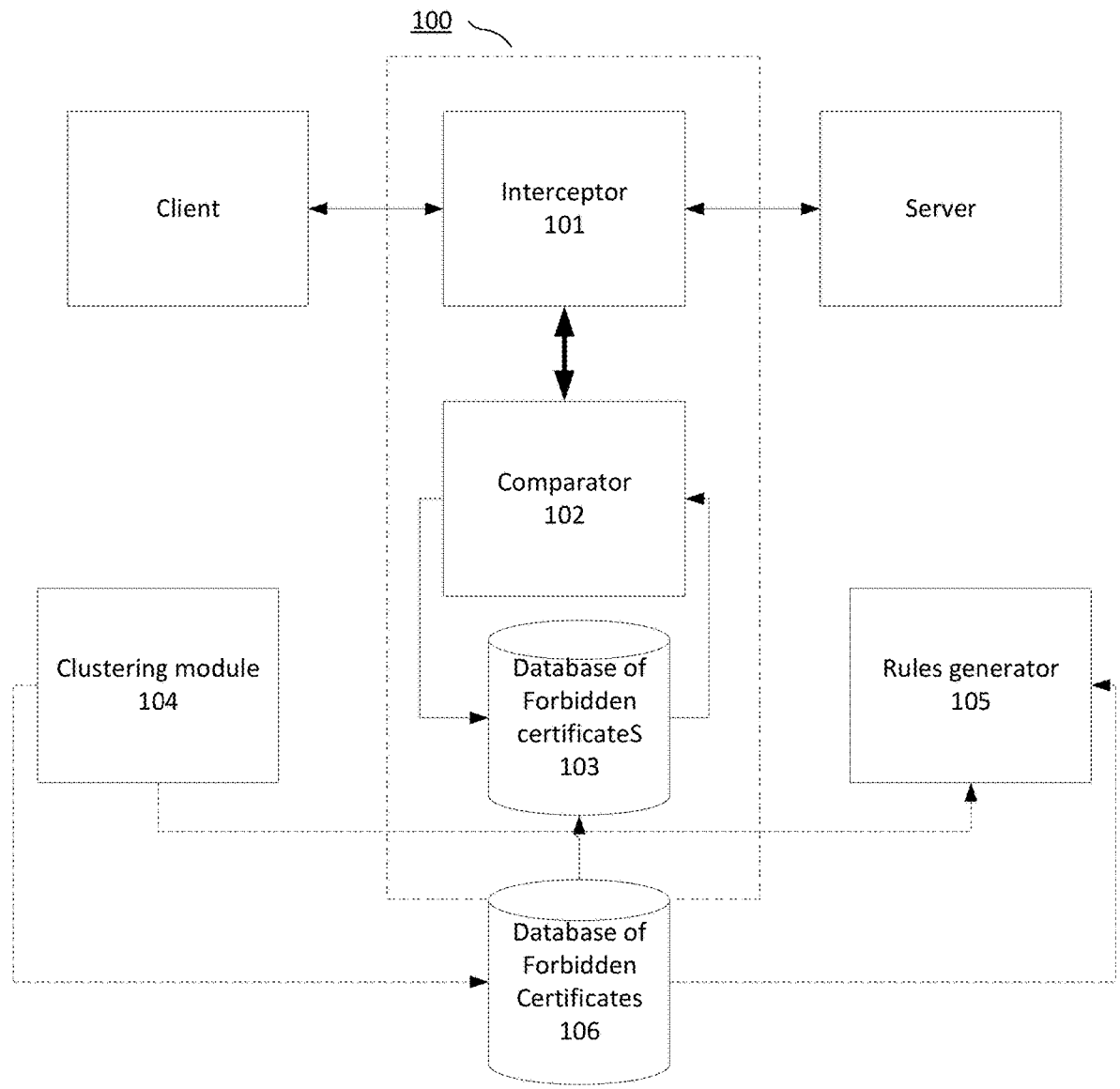
FIG. 1 is a block diagram illustrating an exemplary system for blocking network connections in accordance with aspects of the present disclosure.

FIG. 1 is a block diagram illustrating an exemplary system 100 for blocking network connections in accordance with aspects of the present disclosure.

The system 100 includes at least an interceptor 101, a comparator 102, and a database of forbidden certificates 103. The system 100 may be realized either in distributed or in centralized form. In the first case, the interceptor 101 and the client (for example, a web browser) may be located on the same device (a tablet, a mobile telephone, a personal computer), and the comparator 102 and the database of forbidden certificates 103 may be located on another device of a local area or corporate network (e.g., as shown in 106), within which the device with the client is found. In the case of a centralized realization, the system 100 is located entirely either on the device with the client or on another device (such as a proxy server) through which network traffic is transmitted from the server to the device with the client. The interceptor 101 of the system 100 intercepts traffic coming from the server (such as a web server) to the client (such as a web browser) and extracts the certificate sent from the server to the client. The intercepting may occur by the MITM (man in the middle) scheme and with unpacking of the HTTPS of the traffic, if the certificate is transmitted in a protected tunnel. The intercepted certificate is sent from the interceptor 101 to the comparator 102.

The comparator 102 is used to determine whether the intercepted certificate is similar to forbidden certificates, for which the comparator 102 of the system 100 uses rules (including regular expressions), vectors and clusters (further described below). It must be noted, as a separate matter, that the determination of similarity implies that what is determined is the similarity and not the identity of the certificates, which significantly distinguishes the method of the present disclosure from other solutions which compare the obtained certificates to known ones for the determination of identity, for example, by comparing the fingerprints of the certificates. In other words, the present disclosure describes a method wherein the intercepted certificate is found to be similar if it can be mapped onto a set of forbidden certificates. In one aspect, since the similarity of the intercepted certificates to forbidden certificates is being determined, fuzzy methods are used to determine the mapping, such as regular expressions and proximity measures. Thus, even if the intercepted certificate is identical to a certificate from the set of forbidden ones, as a result of the comparing, the comparator 102 will find the certificates only as being similar—not identical.

The forbidden certificates and/or attributes of forbidden certificates, the clusters, and the rules are kept in a database of forbidden certificates 103. The certificates may be kept both individually (not interrelated) and in a list, where the list is organized by a particular attribute (such as the owner of the certificate, the certification center), being a set of certificates. A particular instance of lists is clusters which do not save the certificates themselves, but rather their mappings—the N-dimensional vectors. Thus, the database of forbidden certificates 103 may save: the forbidden certificates themselves; the forbidden certificates on lists; mappings of forbidden certificates, for example, in the form of rules connecting the common attributes or in the form of N-dimensional vectors; or mappings of forbidden certificates in clusters. If the database saves a mapping of forbidden certificates in N dimensional vectors and/or clusters, it is understood that the database will save a model of the N-dimensional space of forbidden certificates.

Figure 2:
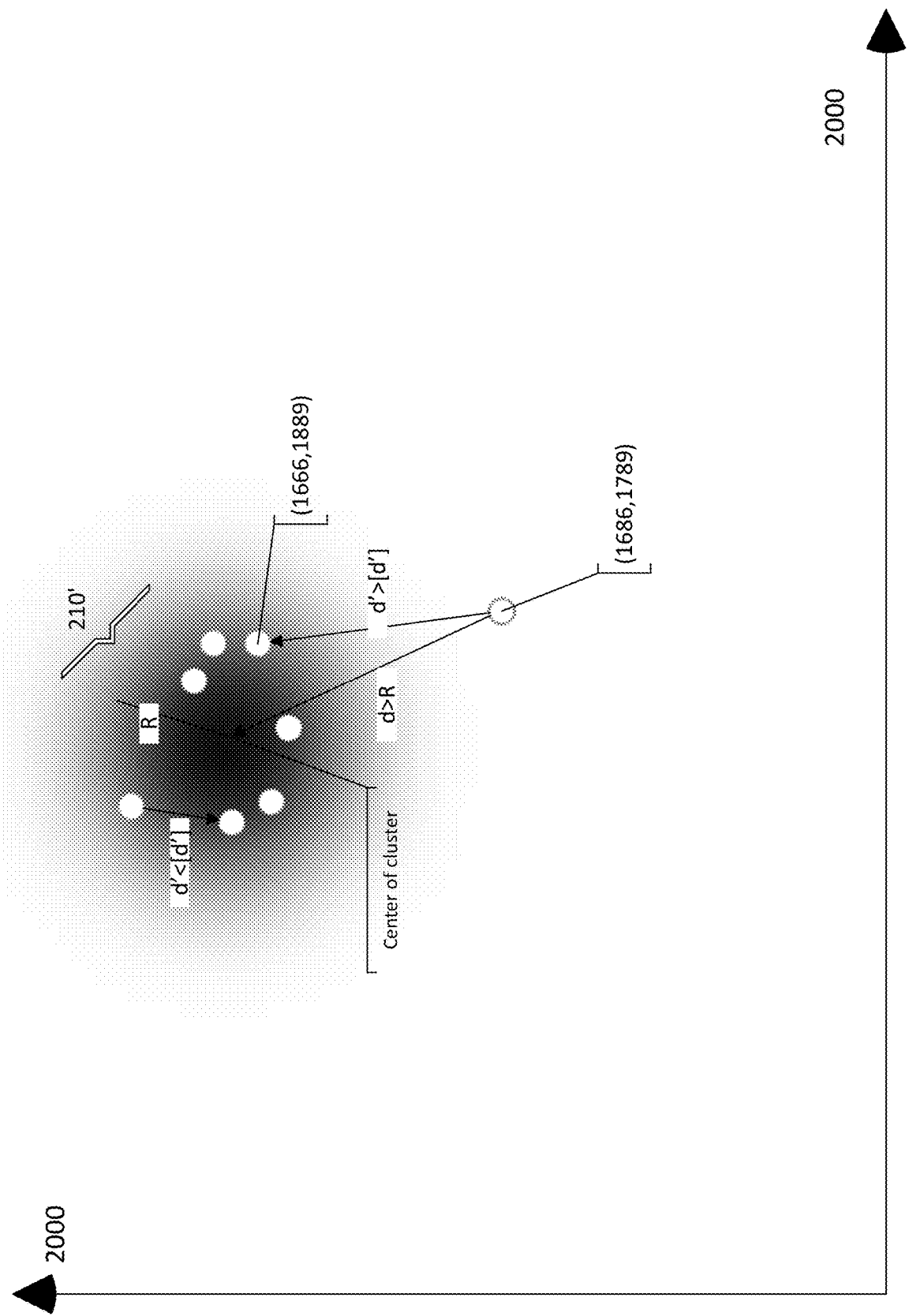
FIG. 2 is an example of a two-dimensional space usable for transforming information about content of a certificate in accordance with the present disclosure.

The N-dimensional vector of a certificate is an ordered set of n real numbers, where the numbers are the coordinates of the vector. The quantity of coordinates of a vector is known as the dimensionality of the vector. The coordinates determine the position of the corresponding certificate or group of certificates of the same type of resources (such as the TOR network) in N-dimensional space. FIG. 2 is an example of a two-dimensional space usable for transforming information about content of a certificate in accordance with the present disclosure. The vector is produced by transforming information about the content of the certificate or group of certificates. The vector maps certain information about the content of the certificate or group of certificates. In one aspect, each coordinate maps one of the characteristics of the certificate, for example, one coordinate characterizes the certification center, another one the owner of the certificate. The numbers may also map the lexicographical order of the string parameters of the certificates or the Levenshtein distance between the string parameters of different elements of the certificate. For example, FIG. 2 shows examples of vectors, in particular two-dimensional vectors with coordinates (1666, 1889) and (1686, 1789).

A cluster is a group of N-dimensional vectors of certificates. The intercepted certificate is assigned to a certain cluster if the distance from the N-dimensional vector of the intercepted certificate to the center of that cluster is less than the radius of the cluster in the direction of the N-dimensional vector. FIG. 2 shows in two-dimensional space an example of a cluster. In one aspect, the certificate will be assigned to a certain cluster if the value of the distance ("d'" in FIG. 2) from the N-dimensional vector of the certificate to the nearest N-dimensional vector of a certificate of this cluster is less than the maximum permissible (threshold value of the distance [d']), or if the value of the distance ("d" in FIG. 2) from the N-dimensional vector of the certificate to the center of that cluster is less than the radius of this cluster. For example, the distance from the vector (1666, 1889) to the center of the cluster is less than the radius of the cluster, and so the certificate or group of certificates whose content is mapped by the vector will belong to that cluster; otherwise, if the distance from the vector (1686, 1789) to the center of the cluster is greater than the radius of the cluster and the distance to the nearest N-dimensional vector is greater than the threshold value, then the certificate or group of certificates whose content is mapped by the N-dimensional vector does not belong to that cluster. Examples of the distances for evaluating the proximity are:
  Linear distance;
  Euclidean distance;
  Square of the Euclidean distance;
  Generalized power distance of Minkowski;
  Chebyshev distance; and
  Manhattan distance.

The measure of proximity (degree of similarity, coefficient of similarity) is a non-dimensional parameter for determining the similarity of certificates. The types of distances and measures of proximity are distance metrics. For determining the measure of proximity one uses the measures:
  Ohaai;
  Jacquard;
  Sokal-Sneath;
  Kulczinsky; or
  symmetrical Dyce.

The center of a cluster (centroid) is the mean geometrical locus of the N-dimensional vectors in N-dimensional space. For clusters consisting of a single vector, that vector is the center of the cluster.

The radius of a cluster (R in FIG. 2) is the maximum distance of the N-dimensional vectors making up the cluster from the center of the cluster.

In addition, a clustering module 104 and a rules generator 105 may be used in the system for blocking network connections 100 to process the forbidden certificates, namely:
  to combine them into lists/clusters; and
  to create rules on the basis of common attributes of the certificates combined into the lists/clusters.

Various known algorithms and methods are used for the clustering of the certificates, including hierarchical (agglomeration and division) and nonhierarchical ones. Clustering is likewise used for the grouping of the certificates by common attributes. Thus, after the clustering, the certificates whose vectors end up in the same cluster are grouped into a single list and a rule is formulated by the rules generator 105 on the basis of attributes common to the certificates (by which they have ended up in the same cluster). The rule may be expressed in the form of a regular expression when the common attributes are expressed by strings.

The processing of forbidden certificates by the clustering module 104 and the rules generator 105 may be done remotely, only downloading the resulting rules into the local database of forbidden certificates 103. In one aspect, the comparator 102 locally transforms the intercepted certificate into an N-dimensional vector of attributes, while the clusters used to compare the resulting vector are kept in a remote database.

The forbidden certificates may be downloaded for processing in the system 100 by the user of the device with the client; by the administrator of a corporate network; by the administrator of a network resource providing the monitoring, dispatching and routing of traffic (such as a provider). In the general case, the assigning of certificates to the forbidden ones by administrators or the user does not depend on the harmfulness of the network resources with which the certificate is associated. Whether a particular certificate is assigned to the forbidden ones is determined by company policies, end user preferences, parental control settings, requirements of local legislation and executive bodies, and the status of the certificate itself (revoked certificates, self-signed certificates, etc.).

Figure 3:
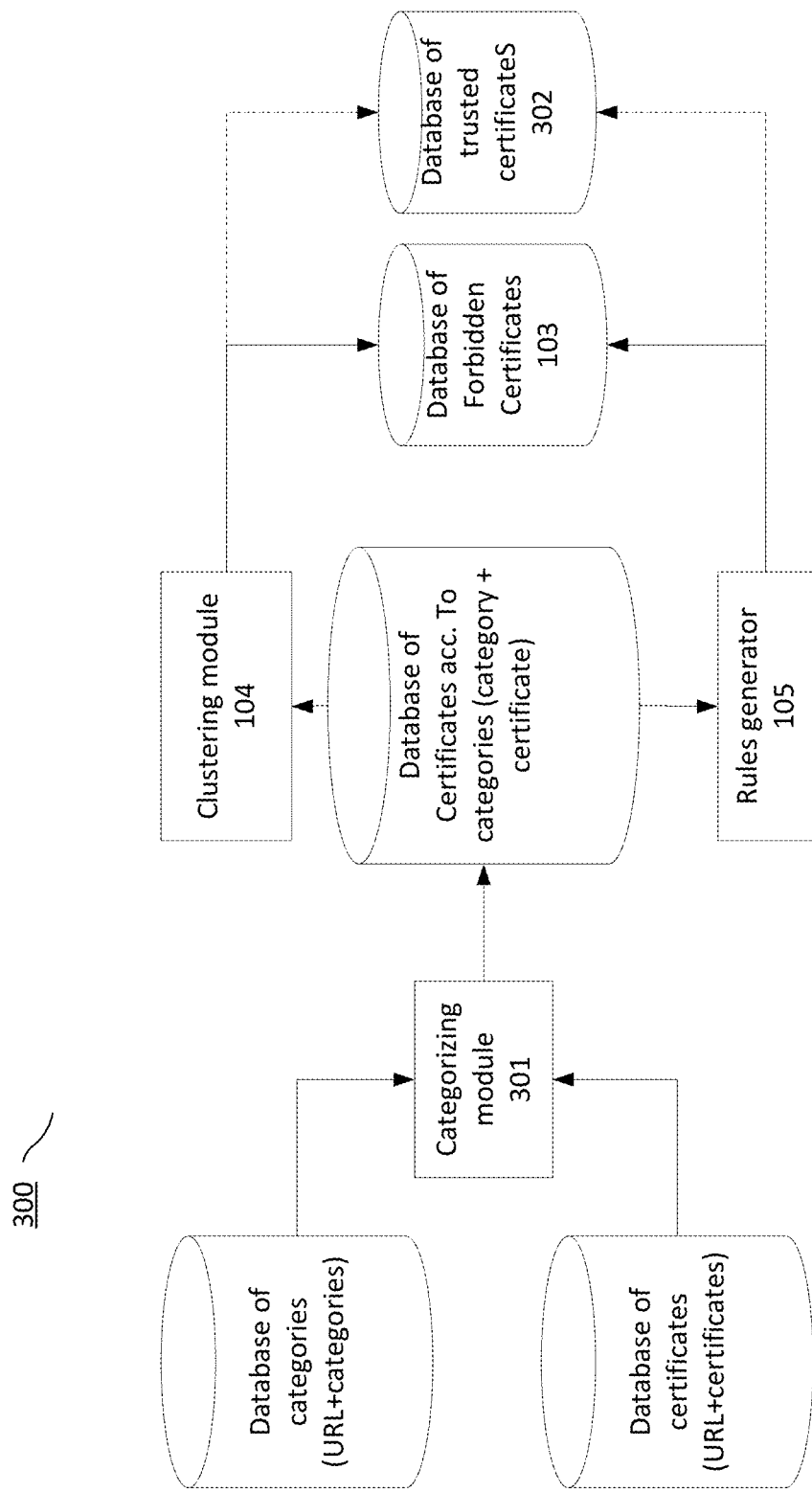
FIG. 3 is a block diagram illustrating an exemplary system for categorizing certificates in accordance with aspects of the present disclosure.

The working of the system for blocking network connections 100 may further be assisted by a system for categorizing certificates. FIG. 3 is a block diagram illustrating an exemplary system 300 for categorizing certificates in accordance with aspects of the present disclosure. Categorizing is used, for example: in parental control systems, when it is necessary to restrict minors from undesirable content; in corporate administration systems, when it is necessary to block employees from entertainment resources. There may be different techniques of categorization, so that the following categories of resources may be identified, in particular:

adult content;
software, audio, video;
alcohol, tobacco, narcotics and psychotropic substances;
violence;
weapons, explosives, pyrotechnics;
profanity;
gambling, lotteries, sweepstakes;
Internet communication media;
electronic commerce;
job search (recruitment);
http query redirection;
computer games;
religions, religious associations; and
news media.

The system for categorizing certificates 300 shown in FIG. 3 is designed to establish a correspondence between certificates and categories of resources, so that the system 300 contains a database of categories which includes the addresses of the network resources and the categories of these resources. In one aspect, the database is formulated in advance and used as is. The system 300 also contains a database of certificates, where each network resource is matched up with a certificate that uses the resource when establishing a connection with a client. The database of certificates of the system 300 is filled, for example, by the blocking system 100. In another aspect, the Microsoft certificate databases may be used, and these methods may also be used together with other possible methods in different combinations. The database of certificates and the database of categories of the system 300 are connected to the categorizing module 301, which is designed to establish a correspondence between the category of a network resource and the certificate on the basis of an intersection at the network resource address. As a result of establishing the correspondence, the categorizing module 301 fills up the certificates database with categories. On the basis of the obtained certificates database with categories, the clustering module 104 and the rules generator 105 fill up the database of forbidden certificates 103. The database of forbidden certificates 103 will contain those certificates or their mappings (vectors, rules, clusters) that pertain to a category of network resources whose accessing is forbidden to the device with the client by policies, laws, executive authority, and so on. The database of forbidden certificates 103 will be used afterwards by the system for blocking network connections 100. The clustering module 104 and the rules generator 105, in another aspect, may be used to fill up a database of trusted certificates 302. The database of trusted certificates 302 will contain those certificates or their mappings (vectors, rules, clusters) that pertain to a category of network resources whose accessing is permitted to the device with the client by policies, laws, executive authority, and so on. The use of the system for categorizing certificates 300 with the system for blocking network connections 100 significantly improves the effectiveness (reduces the errors of the second kind) of functioning of the computer network administration and parental control systems. The enhanced effectiveness is achieved because, in the event of a change of network address or the network certificate by a forbidden resource, the connection to that resource will still be blocked on the basis of the similarity of the intercepted certificate to the certificate from the database of forbidden certificates 103.

Figure 4:
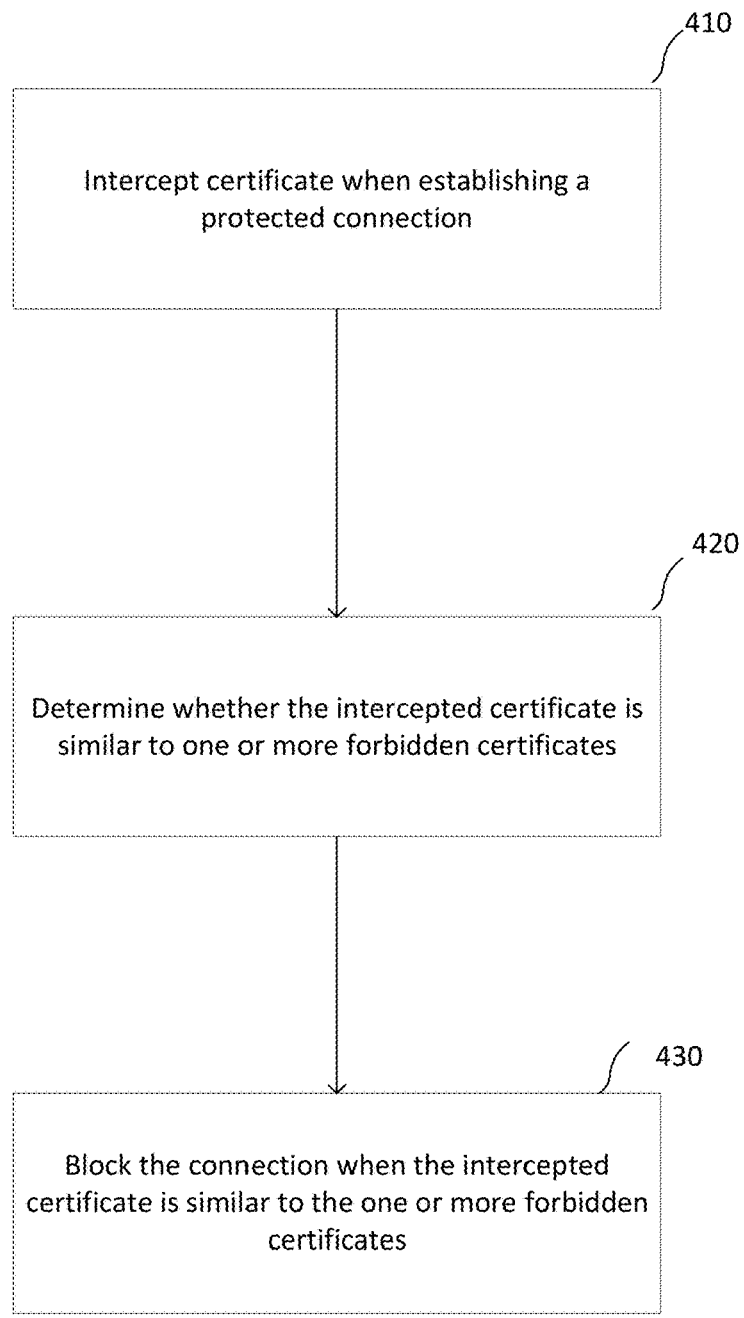
FIG. 4 is a flow diagram illustrating an exemplary method for blocking network connections.

FIG. 4 is a flow diagram illustrating an exemplary method 400 for blocking network connections. The system for blocking network connections 100 is used to carry out the method of blocking network connections 400.

In step 410, when establishing a protected connection between a server and a client, method 400 intercepts, by an interceptor 101, the certificate from the server.

In step 420, the method 400 determines whether the intercepted certificate is similar to one or more forbidden certificates. In one aspect, the determination of whether the intercepted certificate is similar to one or more forbidden certificates comprises: transforming the intercepted certificate in accordance with a method of determining similarities and a method of saving forbidden certificates in a database of forbidden certificates 103.

In one aspect, the method of determining similarities comprises: obtaining attributes from the certificate to construct an N-dimensional vector, and comparing the constructed N-dimensional vector to clusters in the database of forbidden certificates 103.

In one aspect, the at attributes of a given certificate comprise one or more of:
date and time of a start and an end of validity of the given certificate,
an owner of the given certificate of a signature key,
a public key,
a name and details of a certification center,
a designation of a cryptographic algorithm,
information on a restricted use of a signature,
an indication of a country issuing the given certificate,
frequency characteristics of symbols of the given certificate,
line offsets in the given certificate and their respective lengths, and the like.

In one aspect, when constructing the N-dimensional vector of the certificate in the N-dimensional space, different weights are used for each attribute to calculate coordinates of respective attributes, the coordinates being determined, for example, by the frequency of occurrence of the given attribute in the certificates (the lower the frequency, the greater the weight). Such weights may be computed with the aid of neural nets, for example, by using the method of backward error propagation together with the gradient descent method.

The constructed N-dimensional vector is compared (by determining the mutual distance, for example, between the obtained vector and the center of the cluster) with the clusters of forbidden certificates; in one aspect, the cluster may be formed by an N-dimensional vector of only one forbidden certificate.

In one aspect, based on the comparison, the intercepted certificate is found to be similar to the forbidden ones when:
the distance between the N-dimensional vector of the certificate and the center of at least one cluster in the database in N-dimensional space is less than the radius of this clusters; or
the measure of proximity between the N-dimensional vector of an element and the center of at least one cluster in N-dimensional space is less than a threshold value.

In one aspect, a rule is used for comparison instead of the constructed N-dimensional vector. When a rule is used for the comparison instead of the constructed N-dimensional vector, such as one in the form of a regular expression, the rule is applied to the strings of the certificate. For example, for TOR connections the rule will appear as follows:

O=, L=, S=, C=, CN=www\.[0-9a-zA-Z]+\.net.

Then, the intercepted certificate is found to be similar to the forbidden certificates when the rule is satisfied.

If the intercepted certificate is similar to the forbidden certificates, then, in step 430, the connection is blocked by the interceptor 101 of the system 100. The blocking of the given network connection may be done by any method known by those ordinarily skilled in the art of data security.

Returning to FIG. 1 and FIG. 3, the system for categorizing certificates 300 and the system for blocking network connections 100 are used to carry out the method of blocking network connections to resources which are assigned to forbidden categories of resources.

Figure 5A:
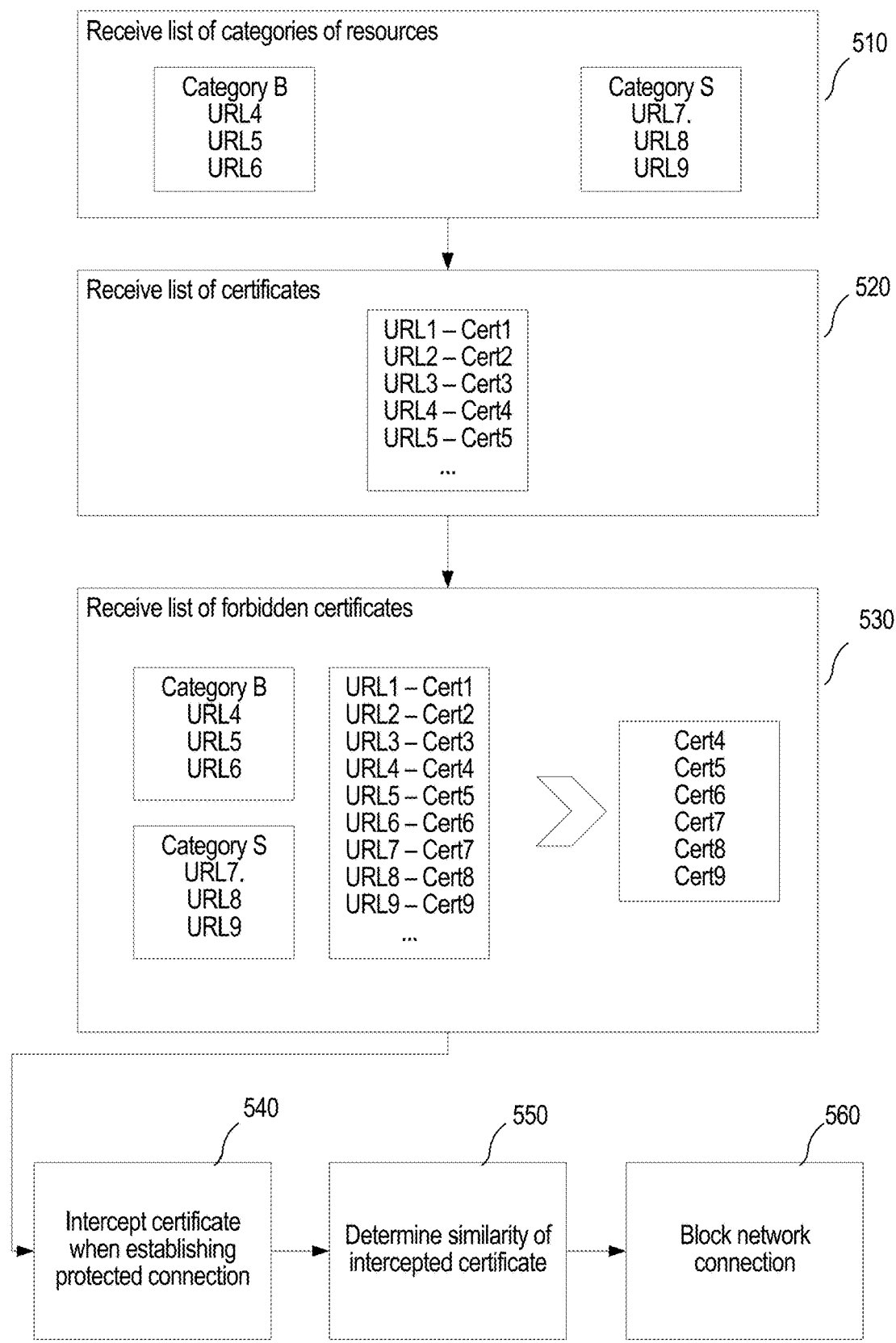
FIG. 5a is a flow diagram illustrating the method for blocking network connections with a formation of a list of forbidden certificates.

FIG. 5a is a flow diagram illustrating the method for blocking network connections with a formation of a list of forbidden certificates. In step 510, a list of forbidden categories of resources is obtained, where each category contains the addresses of network resources assigned to the category of forbidden ones. In step 520, lists of certificates and their corresponding addresses of network resources are obtained. Next, in step 530, a list of forbidden certificates is formed on the basis of the list of forbidden categories of resources, where the certificates corresponding to the addresses of network resources assigned to the category of forbidden resources are assigned to the forbidden certificates. In step 540, the certificate is intercepted at the time of establishing a protected connection, and, in step 550, the similarity of the intercepted certificate to the forbidden certificates is determined; if the intercepted certificate as a result of the determination of similarity is found to be similar to the forbidden certificates, then in step 560, the connection being established is blocked.

In aspects of the present disclosure, a list of categories is obtained without assigning the categories to forbidden ones, which is necessary in the case of flexible systems, where it is not possible to determine a forbidden category in advance, or when the module for blocking network connections is serving several devices to which different network policies are applied.

Figure 5B:
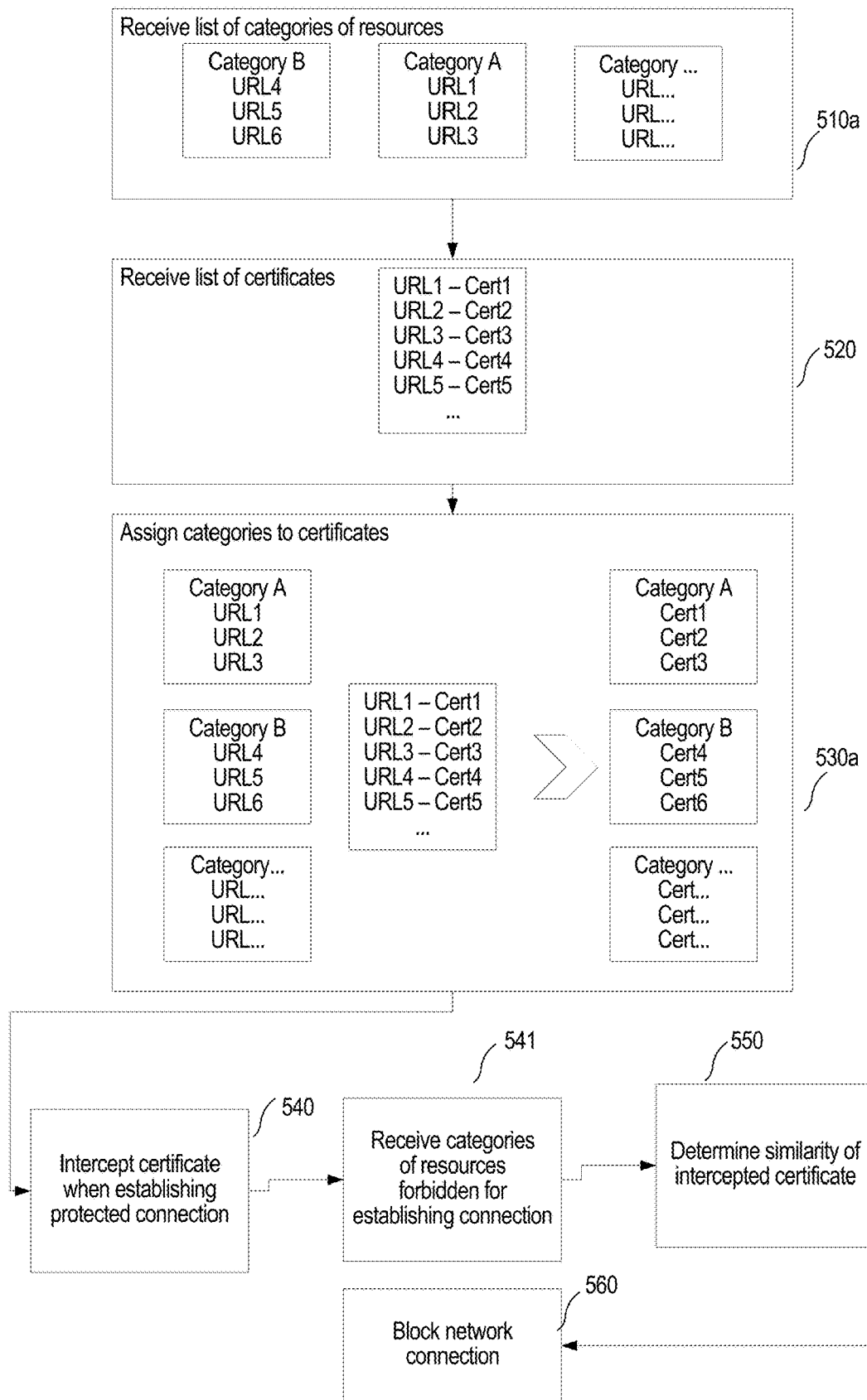
FIG. 5b is a flow diagram illustrating the method for blocking network connections based on a category of a network resource.

FIG. 5b is a flow diagram illustrating the method for blocking network connections based on a category of a network resource. In step 510a, the list of categories of resources is obtained, each category containing the addresses of network resources assigned to the given category. In step 520, the list of certificates and their corresponding addresses of network resources is obtained. Next, in step 530a, the certificate from the obtained list of certificates is assigned a category corresponding to the category of the network resource to which the given certificate belongs. In step 540, the certificate is intercepted at the time of establishing a protected connection of the client with the server and in step 541 the categories of the network resources to which the connection of the client is forbidden are obtained. In step 550, the similarity of the intercepted certificate to certificates assigned to the categories of resources to which connections are forbidden is determined. If the intercepted certificate as a result of the determination of similarity is found to be similar to those certificates, then, in step 560, the connection being established is blocked.

In another aspect, in step 550, it is possible to determine the category of the intercepted certificate by determining the similarity of a given certificate to known certificates whose category has been determined, where the intercepted certificate is assigned the category of the known certificate to which it is similar. In this case, if the determined category of the intercepted certificate is identical to the forbidden category of the network resource obtained in step 541, the connection is blocked.

As described above, the method of the present disclosure for blocking network connections on the basis of a comparison of digital certificates is performed in a real time mode, where a certificate is intercepted at the moment of establishing the protected connection by determining the similarity of the intercepted certificate to forbidden certificates, wherein a certificate is found to be similar if it can be mapped onto a set of forbidden certificates, wherein the mapping is checked by using a rule formed from common attributes of forbidden certificates that are produced as a result of clustering of a set of forbidden certificates.

If the intercepted certificate, as a result of the determination of similarity is found to be similar to forbidden certificates, the connection being established is blocked. In one aspect, attributes are additionally extracted from the intercepted certificate. If the attributes are extracted, the rule may be expressed in the form of a regular expression. When blocking a connection, the similarity of an intercepted certificate to forbidden certificates is determined by using a rule, wherein the rule is satisfied if a similarity is found.

In one aspect, the network connections are blocked in real time using another method for establishing the similarity. In this approach, the certificate is intercepted at the moment of establishing a protected connection. Then, the similarity of the intercepted certificate to forbidden certificates is determined, wherein the mapping is performed using a distance metric. Then, when a certificate can be mapped onto a set of forbidden certificates, it is found as being similar to the forbidden certificates. If the intercepted certificate, as a result of the determination of similarity is found to be similar to forbidden certificates, the connection being established is blocked.

Forbidden certificates can be represented by a cluster containing vectors of attributes of the forbidden certificates. In a particular case, attributes are extracted from the intercepted certificate and are transformed into an N-dimensional vector. During the transformation of attributes of a certificate into an N-dimensional vector, a determination of similarity is done by determining the distance between the N-dimensional vector of the intercepted certificate and the cluster, the intercepted certificate being found to be similar if: the distance between the N-dimensional vector of the certificate and the center of at cluster in N-dimensional space is less than the radius of this clusters, or the measure of proximity between the N-dimensional vector of an element and the center of the cluster in N-dimensional space is less than a threshold value.

The interceptor 101, the comparator 102, the clustering module 104 and the rules generator 105 of the present method comprise actual devices, systems, components, a group of components, realized with the use of hardware such as integrated microcircuits (application-specific integrated circuit, ASIC) or a field-programmable gate array (FPGA) or, for example, in the form of a combination of software and hardware such as a microprocessor system and a set of program instructions, and also based on neuro-synaptic chips. The functionality of the indicated module may be realized exclusively by hardware, and also in the form of a combination, where some of the functionality is realized by software and some by hardware.

Figure 6:
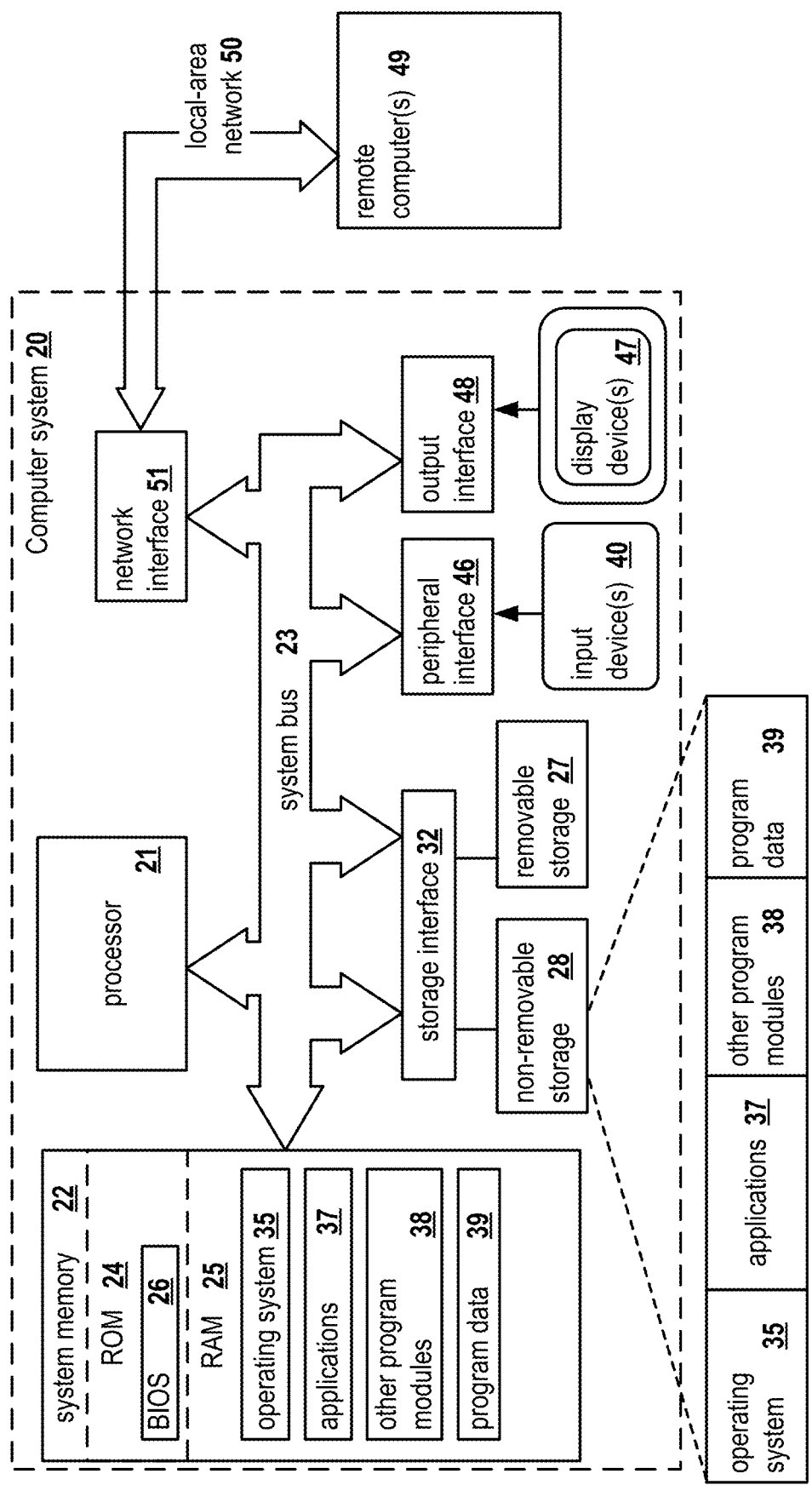
FIG. 6 presents an example of a general-purpose computer system on which aspects of the present disclosure can be implemented.

FIG. 6 is a block diagram illustrating a computer system 20 on which aspects of systems and methods for blocking network connections may be implemented in accordance with an exemplary aspect. It should be noted that the computer system 20 can correspond to a device with an interceptor, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for blocking network connections, the method comprising:
   intercepting, by a hardware processor, a certificate from the server when establishing a secure connection between a server and a client;
   obtaining, by the hardware processor, attributes from the intercepted certificate;
   determining, by the hardware processor, whether the intercepted certificate is similar to one or more forbidden certificates stored in a database of forbidden certificates by (i) retrieving from the database of forbidden certificates a cluster of vectors of attributes of the forbidden certificates, (ii) constructing an N-dimensional vector based on the obtained attributes of the intercepted certificate, and (iii) comparing the constructed N-dimensional vector of attributes of the intercepted certificate to the cluster of vectors of attributes of forbidden certificates produced as the result of clustering, wherein, when constructing the N-dimensional vector based on the obtained attributes, different weights are used for each attribute to calculate coordinates of respective attributes and wherein the coordinates of a given attribute are based on frequencies of occurrences of the given attribute; and
   blocking, by the hardware processor, the connection when the intercepted certificate is similar, based on the determination, to the one or more forbidden certificates.

2. The method of claim 1, wherein the method of determining similarities between the intercepted certificate and the one or more forbidden certificates further comprises:
   expressing, by the hardware processor, a rule in a form of a regular expression, wherein the rule is formed from common attributes of the one or more forbidden certificates that are produced as a result of clustering of a set of the one or more forbidden certificates; and
   applying, by the hardware processor, the rule to strings of the intercepted certificate, wherein the rule is satisfied when a similarity is found.

3. The method of claim 1, wherein the intercepted certificate is found to be similar to a forbidden certificate of the one or more forbidden certificates when:
   a distance between the constructed N-dimensional vector of the certificate and a center of at least one cluster in the database is less than a radius of the at least one cluster; or
   a measure of proximity between the constructed N-dimensional vector and the center of the at least one cluster is less than a threshold value.

4. The method claim 1, wherein the attributes of a given certificate comprise one or more of: a date and a time of a start and an end of validity of the given certificate, an owner of the given certificate of a signature key, a public key, a name and details of a certification center, a designation of a cryptographic algorithm, information on a restricted use of a signature, an indication of a country issuing the given certificate, frequency characteristics of symbols of the given certificate, and line offsets in the given certificate and their respective lengths.

5. A system for blocking network connections, comprising:
- at least one processor configured to:
  - intercept a certificate from the server when establishing a secure connection between a server and a client;
  - obtain attributes from the intercepted certificate;
  - determine whether the intercepted certificate is similar to one or more forbidden certificates stored in a database of forbidden certificates by (i) retrieving from the database of forbidden certificates a cluster of vectors of attributes of the forbidden certificates, (ii) constructing an N-dimensional vector based on the obtained attributes of the intercepted certificate, and (iii) comparing the constructed N-dimensional vector of attributes of the intercepted certificate to the cluster of vectors of attributes of forbidden certificates produced as the result of clustering, wherein, when constructing the N-dimensional vector based on the obtained attributes, different weights are used for each attribute to calculate coordinates of respective attributes and wherein the coordinates of a given attribute are based on frequencies of occurrences of the given attribute; and
  - block the connection when the intercepted certificate is similar, based on the determination, to the one or more forbidden certificates.

6. The system of claim 5, wherein the processor configured to determine similarities between the intercepted certificate and the one or more forbidden certificates is further configured to:
- express a rule in a form of a regular expression, wherein the rule is formed from common attributes of the one or more forbidden certificates that are produced as a result of clustering of a set of the one or more forbidden certificates; and
- apply the rule to strings of the intercepted certificate, wherein the rule is satisfied when a similarity is found.

7. The system of claim 5, wherein the intercepted certificate is found to be similar to a forbidden certificate of the one or more forbidden certificates when:
- a distance between the constructed N-dimensional vector of the certificate and a center of at least one cluster in the database is less than a radius of the at least one cluster; or
- a measure of proximity between the constructed N-dimensional vector and the center of the at least one cluster is less than a threshold value.

8. The system of claim 5, wherein the attributes of a given certificate comprise one or more of: a date and a time of a start and an end of validity of the given certificate, an owner of the given certificate of a signature key, a public key, a name and details of a certification center, a designation of a cryptographic algorithm, information on a restricted use of a signature, an indication of a country issuing the given certificate, frequency characteristics of symbols of the given certificate, and line offsets in the given certificate and their respective lengths.

9. A non-transitory computer readable medium storing thereon computer executable instructions for blocking network connections, including instructions for:
- intercepting a certificate from the server when establishing a secure connection between a server and a client;
- obtaining attributes from the intercepted certificate;
- determining whether the intercepted certificate is similar to one or more forbidden certificates stored in a database of forbidden certificates by (i) retrieving from the database of forbidden certificates a cluster of vectors of attributes of the forbidden certificates, (ii) constructing an N-dimensional vector based on the obtained attributes of the intercepted certificate, and (iii) comparing the constructed N-dimensional vector of attributes of the intercepted certificate to the cluster of vectors of attributes of forbidden certificates produced as the result of clustering, wherein, when constructing the N-dimensional vector based on the obtained attributes, different weights are used for each attribute to calculate coordinates of respective attributes and wherein the coordinates of a given attribute are based on frequencies of occurrences of the given attribute; and
- blocking the connection when the intercepted certificate is similar, based on the determination, to the one or more forbidden certificates.

10. The non-transitory computer readable medium of claim 9, wherein the instruction for determining similarities between the intercepted certificate and the one or more forbidden certificates further comprise instructions for:
- expressing a rule in a form of a regular expression, wherein the rule is formed from common attributes of the one or more forbidden certificates that are produced as a result of clustering of a set of the one or more forbidden certificates; and
- applying the rule to strings of the intercepted certificate, wherein the rule is satisfied when a similarity is found.

11. The non-transitory computer readable medium of claim 9, wherein the intercepted certificate is found to be similar to a forbidden certificate of the one or more forbidden certificates when:
- a distance between the constructed N-dimensional vector of the certificate and a center of at least one cluster in the database is less than a radius of the at least one cluster; or
- a measure of proximity between the constructed N-dimensional vector and the center of the at least one cluster is less than a threshold value.

* * * * *